United States Patent [19]

Akiyama et al.

[11] Patent Number: 4,947,019

[45] Date of Patent: Aug. 7, 1990

[54] COMPOSITE ELECTRODE FOR RESISTANCE WELDING

[75] Inventors: Kazutoyo Akiyama; Takesi Kimura, both of Hekinan; Yoshiharu Terada, Okazaki; Hiromasa Hasegawa, Ageo; Naotake Okabe, Tokyo; Hiroshi Yamaguchi, Higashi-Murayama, all of Japan

[73] Assignees: Nippondenso Co., Ltd, Kariya; MitsuiMining & Smelting Co., Ltd., Tokyo, both of Japan

[21] Appl. No.: 289,915

[22] Filed: Dec. 23, 1988

[51] Int. Cl.⁵ .............................................. B23K 9/24
[52] U.S. Cl. ..................................... 219/119; 219/120
[58] Field of Search .................................. 219/119, 120

[56] References Cited

U.S. PATENT DOCUMENTS

| | | | |
|---|---|---|---|
| 2,322,691 | 6/1943 | Hensel | 219/120 |
| 2,346,088 | 4/1944 | Shobert | 219/119 |
| 2,583,575 | 1/1952 | Katz | 219/120 |
| 3,134,883 | 5/1964 | Bennett et al. | 219/119 |
| 3,363,086 | 1/1968 | Ecklund et al. | 219/119 |

Primary Examiner—George H. Miller, Jr.
Attorney, Agent, or Firm—Flynn, Thiel, Boutell & Tanis

[57] ABSTRACT

A composite electrode for resistance welding of the present invention comprises an electrode made of a high-melting point metal or alloy, an electrode holder made of a copper alloy and an intermediate member made of a copper alloy, the electrode being undetachably inserted into the intermediate member which is detachably mounted in the electrode holder so that the contact surface between the end surface of the electrode and the electrode holder bears welding loads when pressure is applied to the electrode, whereby the electrode can be easily mounted or separated and centering of the electrode can be precisely performed.

8 Claims, 1 Drawing Sheet

COMPOSITE ELECTRODE FOR RESISTANCE WELDING

BACKGROUND OF THE INVENTION

1. Field of the Invention

The present invention relates to a composite electrode which is used for welding, generally of the resistance welding type, in which a workpiece made of copper or the like is welded by applying high current to a high-melting point metal or alloy so as to generate high temperature heat at the same time as high pressure is applied to the electrode (in some cases called pressure welding, fusing or diffusion welding because no molten metal portion is produced during the welding process), and also for heat caulking in which a stainless steel material is thermally deformed and fixed and the like.

2. Description of the Prior Art

As shown in FIG. 1, a conventional electrode body for resistance welding comprises an electrode 1 made of a high-melting point metal or alloy which is inserted into a hole formed in an electrode holder 3 made of a copper alloy and fixed to the holder 3 by utilizing a brazing portion 7 provided therebetween.

When the electrode 1 made of a high-melting point metal or alloy in the conventional electrode body is deformed due to use or becomes worn due to oxidation, the electrode 1 becomes separated from the electrode holder 3 and a new electrode 1 is mounted therein.

The above-described conventional electrode body involves the following problems, however. Firstly, it takes time to do the brazing work when a new electrode is provided. Moreover, the hole formed in the electrode holder 3 becomes enlarged after the electrode 1 has been replaced many times and filler metal removed. This leads to difficulty being encountered in properly centering the electrode.

SUMMARY OF THE INVENTION

It is an object of the present invention to provide a composite electrode for resistance welding capable of solving the above-described problems.

It is another object of the present invention to provide a composite electrode for resistance welding which is capable of preventing any deviation in the position of the electrode, allowing the electrode to be exchanged easily and centered precisely.

It is a further object of the present invention to provide a composite electrode for resistance welding which does not overheat even during use under severe welding conditions and which does not suffer from large plastic deformation.

The present invention provides a composite electrode for resistance welding which comprises an electrode made of a high-melting point metal or alloy, an electrode holder made of a copper alloy and an intermediate member made of a copper alloy, the electrode being undetachably inserted into the intermediate member which is detachably provided in the electrode holder so that the contact surface between the end surface of the electrode and the electrode holder bears welding loads when pressure is applied on the electrode.

In a preferable form of the present invention, the electrode is made undetachable from the intermediate member by providing a tapered surface on the electrode so that its diameter gradually increases toward the rear end of the electrode holder and providing an intermediate tapered surface on the intermediate member to correspond with the tapered surface of the electrode.

At least one of the surfaces of contact between the intermediate member and the electrode and between the intermediate member and the electrode holder is plated with a noble metal, preferably silver, and/or the electrode has a tapered portion which outwardly projects from the intermediate member and which has a diameter gradually increasing from the thin end toward the intermediate member with a taper ratio of 1/35 or more, preferably 1/15 or more.

The electrode holder of the present invention can be made of beryllium copper or alumina dispersion strengthened copper.

DETAILED DESCRIPTION OF THE INVENTION

Figure 1:
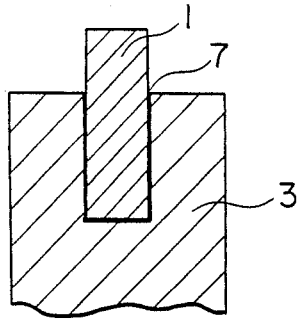
FIG. 1 is a sectional view of a conventional electrode for resistance welding.
Figure 2:
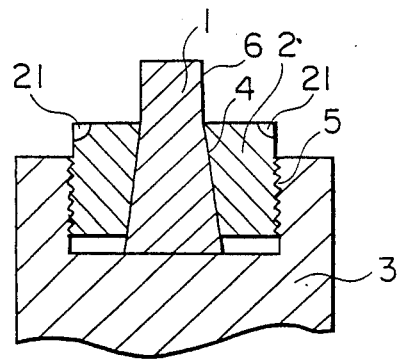
FIG. 2 is a sectional view of an example of a composite electrode for resistance welding.

In FIG. 2, an electrode 1 is inserted into an intermediate member 2 which is screwed into an electrode holder 3 and is detachable therefrom. The intermediate member 2 has two notches 21 which are formed in the surface thereof and into which a jig is inserted to allow rotation of the intermediate member 2. One end surface of the electrode 1 is finished to a flat surface and the portion of the electrode holder 3 which is in contact with this flat surface is also finished flat so that any pressure applied on the top of the electrode 1 is borne by these contact surfaces. The portion of the electrode 1 which is inserted into the intermediate member 2 has a tapered surface 4 having a diameter that gradually increases toward the end thereof and the intermediate member 2 also has a tapered surface which corresponds to the tapered surface 4. Thus the electrode 1 is undetachable from the intermediate member 2 when the latter is engaged with the electrode holder 3 by means of a screw portion 5. Since the tapered surface 4 of the electrode 1 and the tapered surface of the intermediate member 2 cause the electrode 1 to be pressed against the holder side, the provision of these tapered surfaces enables an increase in the contact area between the electrode 1 and the intermediate member 2 and thus allows the heat in the electrode 1 to easily escape therefrom to the holder side through the intermediate member 2.

Since the electrode can be mounted by inserting it into the intermediate member 2 and then detachably engaging the intermediate member 2 with the electrode holder 3 by a known means such as screwing, no change occurs in the diameter of the hole formed in the holder as in a conventional electrode body which employs soldering, and centering of the electrode can be performed easily.

Figure 3:
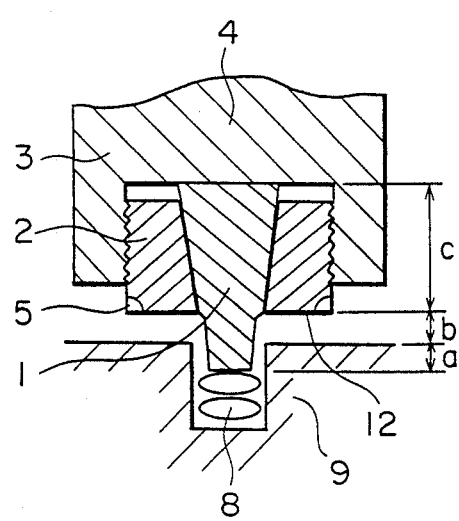
FIG. 3 is a sectional view of another example of a composite electrode for resistance welding in the state in which it is actually used.
Figure 4:
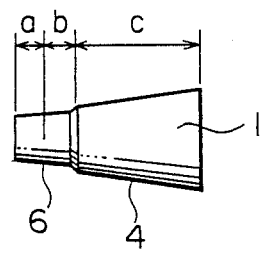
FIG. 4 is an explanatory view of the external form of an example of an electrode to which the present invention relates.

FIG. 3 shows a case in which a groove formed in a copper material 9 is filled with stranded copper wires 8 and resistance welding is performed using a composite electrode in an embodiment of the present invention. FIG. 4 shows the external form of the electrode 1 used in the present invention. In FIGS. 3 and 4, the head a of the electrode 1 serves to transmit the Joule's heat generated by it to the material being worked, as well as losing heat to the latter. On the other hand, an intermediate portion b of the electrode 1 generates Joule's heat and is thus extremely hot, the Joule's heat being transferred to the portion a or a base c owing to heat conduction. The base c of the electrode 1 generates Joule's heat which is transferred to the intermediate member 2 and the electrode holder 3. The intermediate portion b of the electrode 1 is therefore the portion which is most easily heated.

In a composite electrode that is used under particularly severe conditions, therefore, the electrode 1 may be prevented from generating excessive heat, i.e., the heat generated from the intermediate portion b of the electrode 1 can be efficiently transferred outwardly.

In the present invention, noble metal plating, preferably silver plating, is provided on at least one of the contact surfaces between the intermediate member 2 and the electrode 1 and between the intermediate member 2 and the electrode holder 3 in the composite electrode which is designed to be particularly used under severe conditions. In the embodiment shown in FIG. 3, this silver plating is denoted by reference numeral 12 and a silver plate layer having a thickness of about 2 $\mu$ is formed.

The Joule's heat generated by the electrode 1, particularly the heat generated by the portion b or c, is transferred to the silver plate layer 12 which has low electrical resistance and transferred to the intermediate member 2 and the electrode holder 3, thereby preventing the overheating of the electrode. Although all the surfaces of the intermediate member 2 are plated with silver in the standard form of the present invention, as will be seen from the function described below, it may be sufficient for just the portion that is in contact with the electrode and the holder to be plated with silver. The silver plating of the intermediate member 2 will substantially prevent oxidation of the surface even if the intermediate member is brought into contact with the electrode at a high temperature and thus the contact resistance between the intermediate member and the electrode or the electrode holder is not readily increased. The plating material is not limited to silver, and any material (for example, a noble metal such as gold or the like) with good thermal conductivity which is capable of preventing the formation of an oxidation film may be used. Silver plating, however, exhibits a strength which is greater than that of, for example, gold plating, and will thus not become easily separated from the intermediate member.

As shown in FIG. 4, the electrode 1 has a form in which a tapered surface 6 having a diameter that gradually increases toward the intermediate member 2 is so formed as to extend from the end of the tapered surface 4 of the electrode 1 which corresponds to the tapered surface of the intermediate member 2. In other words, the tapered surface 6 is formed in the portion of the electrode 1 which outwardly projects from the intermediate member 2.

The diameter of the head of the electrode 1 is determined by the shape of the relevant work. The head of the electrode 1 corresponds to a heating element which functions to supply the heat required for welding, and the base of the electrode 1 corresponds to a support for the heating element and thus need not become extremely hot. From this viewpoint, it is preferable that the head of the electrode has a smaller diameter so as to easily generate heat and the base thereof has a larger diameter so that generation of heat is controlled. In the present invention, the portion of the electrode 1 which outwardly projects from the intermediate member 2 has a diameter that gradually increases toward the intermediate member 2 from its thinnest end. The Joule's heat generated in the portion b is therefore easily transferred to the portion c owing to the increase in the cross-sectional area of the portion b, as well as being easily transferred to the electrode holder 3 or the intermediate member 2. In this way, if the electrode has the portion having a diameter that gradually increases toward the intermediate member 2 from the thinnest end, the degree of generation of heat is controlled in the portion which basically need not generate heat, and the radiation of the heat generated is promoted therein, resulting in the prevention of overheating of the electrode and an increase in the strength thereof. This tapered surface 6 has a taper ratio of 1/35 or more, preferably 1/15 or more. If the tapered surface 6 has a taper ratio of less than 1/35, the Joule's heat in the portion b is not sufficiently transferred to the portion c and the strength of the electrode in the portion b is relatively weak. As a result, the electrode is not easily deformed and the lifetime thereof is thus increased.

For the same reason, the composite electrode of the present invention is so configured that the welding loads applied to the electrode 1 are borne by the contact surface between the end surface of the electrode 1 and the electrode holder 3. If the electrode holder 3 is not hard, therefore, the electrode 1 is sunk into the holder side due to the pressure applied during welding. Since the occurrence of sinking of the electrode 1 causes a gap between the electrode 1 and the intermediate member 2 which leads to a resistance, the heat in the electrode 1 does not readily escape. The holder 3 must therefore be made of a hard material. The material of the holder 3 must also have current conductive characteristics and thermal conductive characteristics. It is therefore advantageous that the electrode holder 3 is made of beryllium copper or alumina dispersion strengthened copper.

Since the intermediate member 2 is not directly subjected to the pressure of the electrode 1, it need not be made of the same material as that of the holder 3, but it rather has excellent heat resistance from the viewpoint of contact with the electrode at a high temperature. The intermediate member 2 may therefore be made of alumina dispersion strengthened copper, beryllium copper or chromium copper which is used in conventional electrode holders, while the holder 3 is made of beryllium copper or alumina dispersion strengthened copper. As a matter of course, however, the intermediate member 2 is preferably made of a hard material so that the screw portion thereof is damaged to a reduced extent by tightening of the intermediate member 2 even if the intermediate member 2 is used many times.

Examples of materials for the electrode 1 that may be used in the present invention include metals which are generally used in welding and which have a high melting point and electrical conductivity of 5 to 60% IACS, such as pure tungsten, pure molybdenum, heavy metals containing tungsten and small amounts of copper and nickel, copper-tungsten alloys, silver-tungsten alloys, copper-tungsten carbide alloys and the like. As described above, either of the intermediate member 2 or the electrode holder 3 is suitably made of copper or a copper alloy such as chromium copper, alumina dispersion strengthened copper, beryllium copper or the like which exhibits excellent electrical conductivity and, preferably, heat resistance. It is particularly preferable that each of the electrode holder and the intermediate member is made of beryllium copper (low-beryllium copper, nickel or cobalt beryllium alloy) or alumina dispersion strengthened copper, as described above.

In order to examine the life of the above-described composite electrode in an embodiment of the present invention, Samples 1 to 6 including Comparative Example which are shown in Table 1 were produced. Weld tests were conducted under the following conditions:

Electrodes

Upper electrode ... Samples 1 to 6
Lower electrode ... Flat electrode

Piece to be welded

A groove having a width of 2 mm and a depth of 3.2 mm was formed in a bus bar made of pure copper and two single copper wires of 1.8 mm $\phi$ were buried in the groove.

Weld conditions:

current ... 3000 A
pressure ... 300 kg

The results obtained are shown in Table 1. The life was decided by chipping or large deformation of electrodes.

TABLE 1

| Sample | Silver plate | Taper | Material of holder | Life |
| --- | --- | --- | --- | --- |
| 1 | Present | 1/11 | Cu—Ni—Be | 3000 points |
| 2 | Present | 1/21 | Alumina dispersion strengthened copper | 2800 points |
| 3 | Present | 1/33 | Cu—Ni—Be | 1400 points |
| 4 | Present | 0 | Cu—Ni—Be | 1200 points |
| 5 | None | 0 | Cu—Ni—Be | 900 points |
| 6 | None | 0 | Cu—Cr | 700 points |

Figure 5:
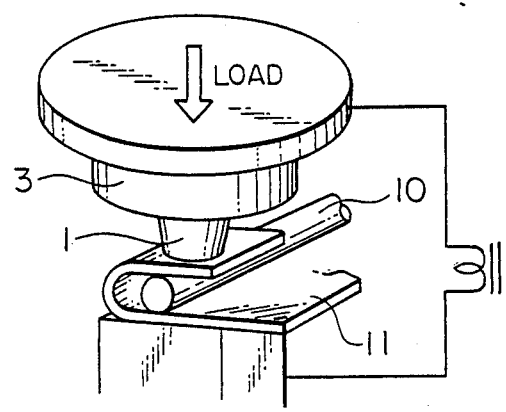
FIG. 5 is an explanatory perspective view of a case in which a composite electrode for resistance welding of the present invention is applied to fusing of a motor rotor.

FIG. 5 shows an example in which the composite electrode of the present invention is used for fusing of a motor rotor. In FIG. 5, reference numeral 10 denotes a covered copper wire and reference numeral 11 denotes a copper material. In this way, the present invention is suitable for welding a copper wire which is wound around a rotor to a commutator in a generator, a motor, a starter or the like. The present invention can also be used for general resistance welding which requires precise centering and which is particularly carried out under at a high temperature and high pressure. The present invention enables an electrode to be easily mounted or separated and the centering thereof to be precisely performed, as well as enabling the achievement of an industrially useful composite electrode having a long life.

What is claimed is:

1. A composite electrode for resistance welding comprising an electrode made of a high-melting point metal or alloy, an electrode holder made of a copper alloy and an intermediate member made of a copper alloy, screw portions respectively formed in the periphery of said intermediate member and in said electrode holder so as to engage with each other, said intermediate member being screwed into said electrode holder by means of said screw portions so that said intermediate member is detachably mounted in said electrode holder, said electrode being made undetachable from said intermediate member by providing a tapered surface on said electrode so that its diameter increases toward the rear end of said electrode holder and providing a tapered surface on said intermediate member corresponding to said tapered surface of said electrode so that, when pressure is applied to said electrode, the contact between the end surface of said electrode and the opposing surface of said electrode holder bears welding loads and said tapered surfaces cause said end surface of said electrode to be pressed against the opposing surface of said electrode holder.

2. A composite electrode for resistance welding according to claim 1 wherein at least the surface of said intermediate member in contact with said electrode and said holder is coated with a noble metal.

3. A composite electrode for resistance welding according to claim 2, wherein said intermediate member is plated with silver.

4. A composite electrode for resistance welding according to claim 1, wherein said electrode has a portion which projects outwardly from said intermediate member and which has a second tapered surface formed thereon so that its diameter gradually increases toward said intermediate member from the thinnest end thereof.

5. A composite electrode for resistance welding according to claim 4, wherein the taper ratio of said second tapered surface on said electrode is 1/35 or more.

6. A composite electrode for resistance welding according to claim 4, wherein the taper ratio of said second tapered surface on said electrode is 1/15 or more.

7. A composite electrode for resistance welding according to claim 1, wherein said electrode holder is made of beryllium copper or alumina dispersion strengthened copper.

8. A composite electrode for resistance welding according to claim 1, wherein said intermediate member is made of beryllium copper or alumina dispersion strengthened copper.

* * * * *